United States Patent
Iglio et al.

(10) Patent No.: US 12,049,369 B2
(45) Date of Patent: Jul. 30, 2024

(54) PLANTS FOR THE TREATMENT OF BODYWORKS

(71) Applicant: GEICO S.p.A., Cinisello Balsamo (IT)

(72) Inventors: Valerio Iglio, Cinisello Balsamo (IT); Salvatore Frustaci, Cinisello Balsamo (IT)

(73) Assignee: Geico S.p.A., Cinisello Balsamo (IT)

( * ) Notice: Subject to any disclaimer, the term of this patent is extended or adjusted under 35 U.S.C. 154(b) by 449 days.

(21) Appl. No.: 17/423,064

(22) PCT Filed: Feb. 3, 2020

(86) PCT No.: PCT/IB2020/050826
§ 371 (c)(1),
(2) Date: Jul. 14, 2021

(87) PCT Pub. No.: WO2020/161590
PCT Pub. Date: Aug. 13, 2020

(65) Prior Publication Data
US 2022/0063933 A1    Mar. 3, 2022

(30) Foreign Application Priority Data
Feb. 4, 2019 (IT) .......................... 102019000001557

(51) Int. Cl.
B65G 49/04 (2006.01)
(52) U.S. Cl.
CPC ................ B65G 49/0459 (2013.01)
(58) Field of Classification Search
CPC ................................................ B65G 49/0459
See application file for complete search history.

(56) References Cited

U.S. PATENT DOCUMENTS

2017/0369255 A1* 12/2017 Iglio .................. B65G 49/0418

FOREIGN PATENT DOCUMENTS

| EP | 1424269 A2 | 6/2004 |
| EP | 3237314 B1 | 3/2020 |
| WO | 2016/103108 A1 | 6/2016 |

OTHER PUBLICATIONS

International Search Report and Written Opinion in corresponding International Application No. PCT/IB2020/050826 mailed on May 19, 2020, 10 pages.

* cited by examiner

Primary Examiner — Nirvana Deonauth
(74) Attorney, Agent, or Firm — MH2 Technology Law Group LLP

(57) ABSTRACT

A plant for treatment of bodyworks may include: at least one trolley configured to support a bodywork to be treated; a conveying line configured to transport the at least one trolley along the plant; a first system configured to move the at least one trolley along the conveying line; a second system configured to move the at least one trolley along the conveying line; and sensors configured to detect angular position of a toothed traction wheel and approaching movement of the at least one trolley toward the toothed traction wheel. The at least one trolley may include a traction rack extending in a direction of movement of the at least one trolley along the conveying line in at least one zone of the plant. The toothed traction wheel may be configured to engage the traction rack upon passage of the at least one trolley into the at least one zone.

20 Claims, 5 Drawing Sheets

PLANTS FOR THE TREATMENT OF BODYWORKS

CROSS-REFERENCE TO RELATED APPLICATION(S)

This application is a national stage entry from International Application PCT/IB2020/050826, filed on Feb. 3, 2020, in the Receiving Office ("RO/IB") of the World Intellectual Property Organization ("WIPO"), published as International Publication No. WO 2020/161590 A1 on Aug. 13, 2020. International Application No. PCT/IB2020/050826 claims priority under 35 U.S.C. § 119 from Italian Patent Application No. 102019000001557, filed on Feb. 4, 2019, in the Italian Patent and Trademark Office ("IPTO"), the entire contents of all of which are incorporated herein by reference.

The present invention relates to a plant for the treatment of bodywork, in particular for motor vehicles and the like and to an operating method.

In the art treatment plants which comprise conveyor lines for transporting a plurality of trolleys, for example in the form of sliding units or skids, each comprising a bodywork to be treated, are known.

For example treatments which involve the immersion of the bodywork in special basins filled with treatment liquid, for example for performing anti-corrosion and electrophoresis pre-treatments, are known. These plants have, arranged opposite the basins, immersion systems which for example rotate the bodywork on the trolley so that it can be immersed in the basin and then extracted.

It has been noted that in some points of the plant the trolley may require an additional thrust to overcome particular resistance to the advancing movement. For example, in immersion systems with rotation of the bodywork, the rotating movement may require a temporary increase in the advancing force of the trolley. For example, this may be caused by an imbalance in the weight of the bodywork on the trolley with respect to the axis of rotation.

In particular, immersion systems which obtain the rotational force from the advancing movement itself of the trolley are known. For example, such a rotation system has been proposed in the patent EP3237314. In this document it was also proposed using additional traction systems consisting of a motorized wheel which rests with friction on a longitudinal surface of the trolley and helps the transportation system to push the trolley forwards during rotation of the bodywork.

The use of a friction wheel has, however, a fairly low limit value of the tractional force which the wheel may apply to the trolley and, especially in particularly demanding applications (for example particularly heavy bodywork which must be rotated), the wheel in some conditions may slip on the surface of the trolley. The torque which can be transmitted by the wheel may also decrease significantly owing to the dirt or liquid between the surfaces making contact. Moreover, the wheel may be subject to a relatively high degree of wear and this may result in a further reduction in the traction which can be imparted by the wheel on the trolley and the production of waste matter which may contaminate the bodywork treatment basins. Attempts have also been made to improve the adhesion of the wheel by increasing the force with which it is pushed against the surface of the trolley, but this system worsens further the wear and continues in any case to have a relatively low limit value of the torque which can be transmitted before slipping of the wheel occurs.

The object of the present invention is to provide a plant and a method which solves the aforementioned problems of the prior art.

In view of this object the idea which has occurred, according to the invention, is to provide a plant for the treatment of bodywork, comprising at least one trolley designed to support a bodywork to be treated, a conveyor line for transporting the trolley along the plant and with a first system for moving the trolleys along the conveying line, characterized in that the trolley comprises a traction rack extending in the direction of movement of the trolley along the conveying line and, in at least one zone of the plant, there is a toothed traction wheel which is driven by a motor controlled by a motor control system and which is adapted to engage in the traction rack upon passage of the trolley into this zone so as to move the trolley along a portion of the conveying line under the control of the motor control system and provide a second movement system for the trolleys, there being also sensors designed to detect the angular position of the traction wheel and the approaching movement of a trolley towards this wheel and connected to the motor control system of the toothed wheel so as to cause the engagement between the traction rack and the toothed traction wheel upon arrival of the trolley.

Still according to the invention the idea which has occurred is to provide a method for providing an additional traction to trolleys for transporting bodywork in zones along a line for conveying the trolleys in a plant for treating such bodywork, comprising the steps of providing on the trolleys a traction rack extending in the direction of movement of the trolleys along the conveying line, arranging in said zones along the conveying line a toothed traction wheel which is driven by a motor controlled by a motor control system and which is able to engage in the traction rack when the trolley passes into said zone so as to move the trolley along a portion of the conveying line under the control of the motor control system, arranging sensors designed to detect the angular position of the traction wheel and the approach movement of a trolley towards said wheel and connected to the motor control system of the toothed traction wheel, and the further steps of detecting the angular position of the toothed traction wheel and, when the toothed traction wheel is not engaged in the traction rack, driving the motor so as to bring this wheel into a given position suitable for subsequent engagement with the traction rack of an inbound trolley, detecting the arrival of a trolley and starting the motor with a predetermined acceleration ramp when the front end of the traction rack approaches the toothed traction wheel until the toothed traction wheel and the traction rack are engaged and driving the motor so as to continue the rotation of the toothed traction wheel for a pushing action of the trolley along the conveying line by means of the traction rack engaged in the toothed traction wheel.

In order to illustrate more clearly the innovative principles of the present invention and its advantages compared to the prior art, an example of embodiment applying these principles will be described below with the aid of the accompanying drawings. In the drawings.

Figure 1:
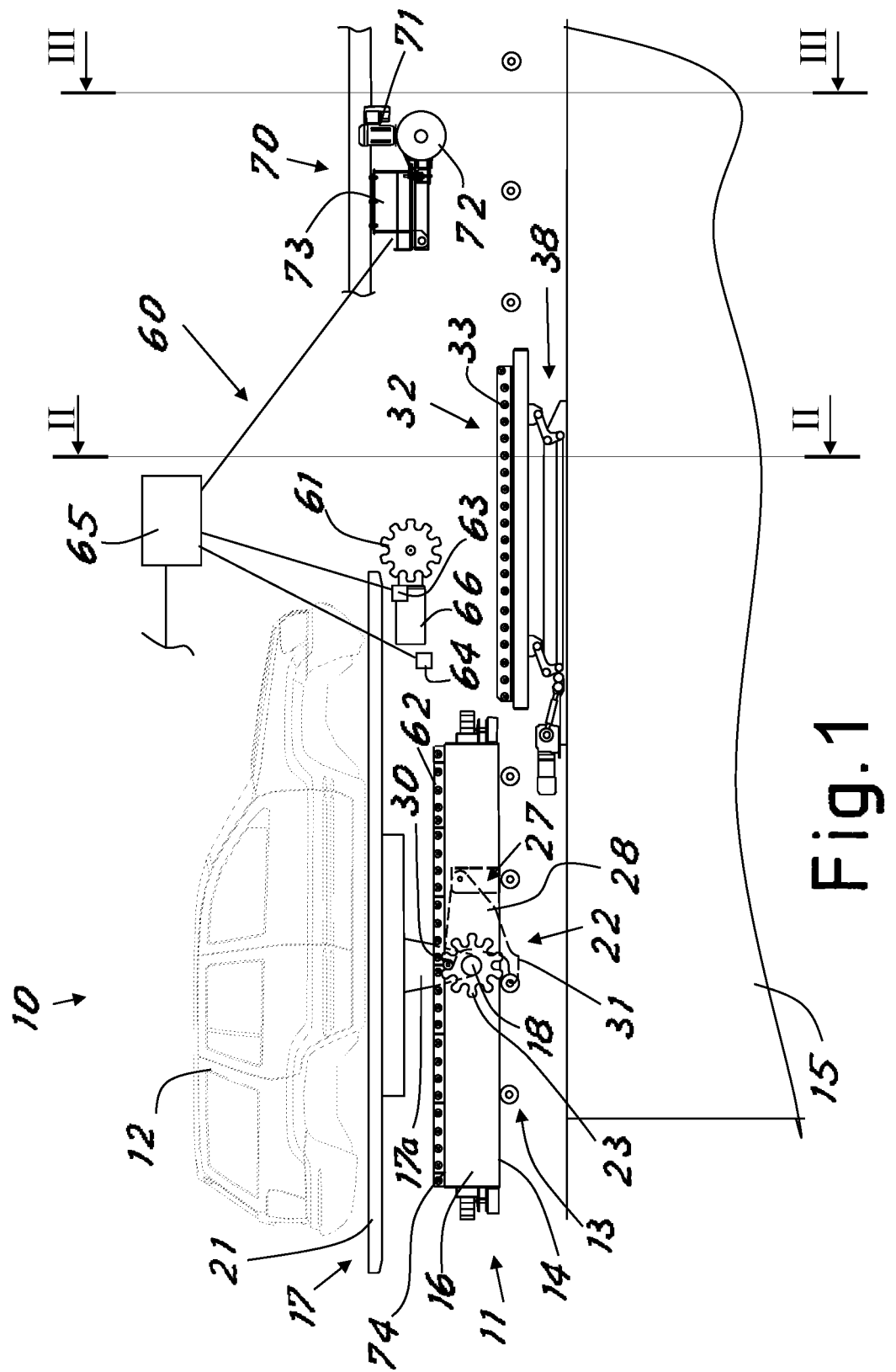
FIG. 1 shows a schematic side elevation view of a part of a plant designed according to the invention.

With reference to the figures, FIG. 1 shows in schematic form a first example of a part of a plant, denoted overall by 10, applying the principles of the present invention.

The plant 10 comprises at least one means of transport for a bodywork 12, which is here generally referred to as a trolley 11 (for example, it may be a sliding unit or skid or an actual wheeled trolley 11) intended to support a bodywork 12 to be treated. Usually the trolleys 11 will consist of a plurality and will travel along the plant 10 in sequence so as to each transport a bodywork 12 to be treated into the various treatment stations.

The plant 10 also comprises a conveying line 13 for the sequential transportation of the trolleys 11 along the plant 10.

As will be clarified below, the plant 10 comprises at least one first system for moving the trolleys 11 along the conveying line 13.

The conveying line 13 may comprise, for example, travelways, arranged parallel, for lateral support elements 14 of the trolley 11, such as runners and/or wheels, and the advancing movement may be produced, for example, by a series of motorized rollers on which the trolleys 11 rest and/or by other known motorized movement means, as may be easily imagined by the person skilled in the art.

Figure 2:
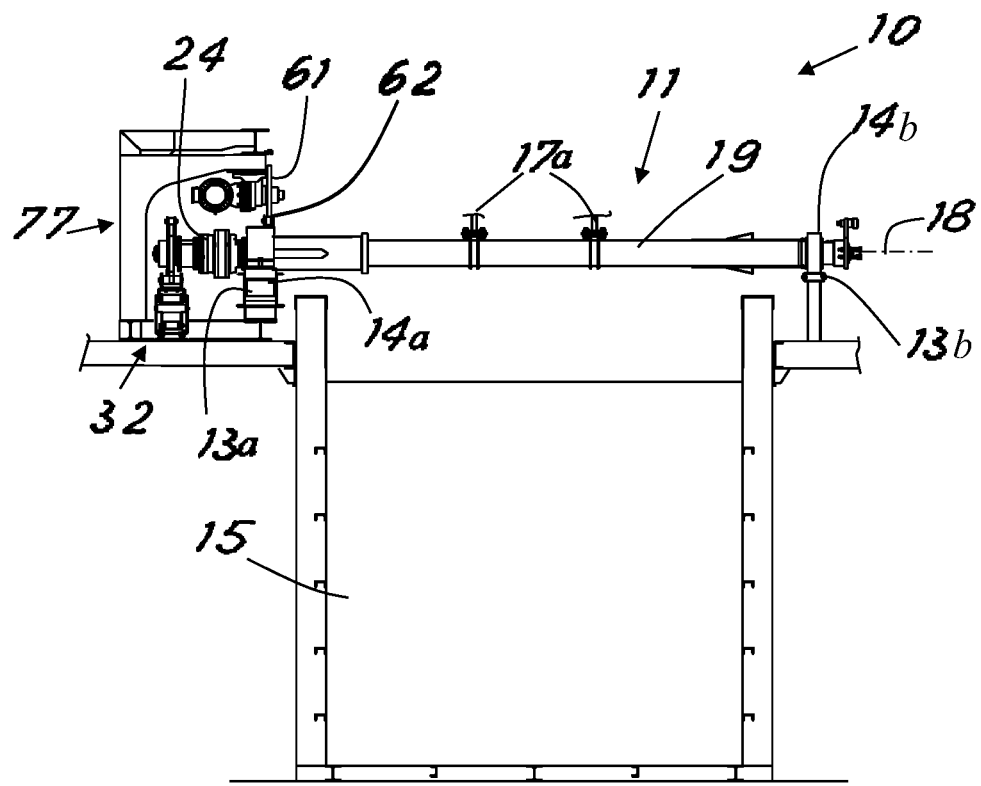
FIG. 2 shows a schematic view of the plant cross-sectioned along the line II-II of FIG. 1.

As can be clearly seen in FIG. 2, the trolleys 11 may comprise, for example, lateral support elements 14 formed, for example, on one side by a lateral runner 14a and on the other side by one or more wheels 14b. The lateral runner 14a may rest on one side of the conveying line 13, for example, formed with rollers 13a, while the wheel 14b may rest on a sliding surface or track 13b.

Those rollers of the conveying line 13, which may be motorized may be all connected to a single motor, for example, by means of a chain system, as may be easily imagined by the person skilled in the art.

Other known systems for normal transportation of the trolleys 11 along the conveying line 13 may in any case be used, as may be easily imagined by the person skilled in the art on the basis of the description provided here.

Different sections of the conveying system may also be motorized separately and/or use different systems for moving the trolleys 11 in order to obtain, for example, asynchronous transportation of trolleys 11, which may thus be moved at different speeds and/or stop along the various sections.

The plant 10 also comprises at least one known process liquid basin 15 inside which the bodywork 12 must be immersed, for example, for an anti-corrosion and electrophoresis pre-treatment. Below reference will be made to a basin 15, but it is understood that the basins 15 may consist of a plurality along the plant 10, also depending on the number and type of treatments required, as will be evident to the person skilled in the art.

The trolley 11 described here advantageously comprises a base part 16 for sliding along the conveying line 13 and a top part 17 which supports the bodywork 12 and is rotatable about an axis 18 of a rotatable shaft 19 supported by the base part 16. Preferably, the axis 18 may be transverse to the direction of movement, even though other arrangements (for example, a longitudinal or inclined arrangement) may be used.

With reference to FIG. 2, the base frame of the trolley 11 may comprise, for example, on one side, the lateral runner 14a, a central crossbeam which comprises or is formed by the rotatable shaft 19 and its corresponding support elements on the frame, and an opposite support point at the other end of the rotatable shaft 19 formed, for example, by a wheel 14b. The base part 16 may thus have advantageously a generally T-shaped form in plan view. Alternatively, the base part 16 could in any case have an H-shaped frame with longitudinal runners on both sides. In any case, the lateral support points of the base part 16 of the trolley 11 on the conveying line 13 are advantageously situated on the outside of the sides of the basins 15.

As can be clearly seen in FIG. 1, the top part 17 of the trolley 11 may comprise one or more support elements 17a which extend from the rotatable shaft 19 so as to support and lock the bodywork 12 to the rotatable shaft 19 by means of known fixing means, optionally via a support surface or frame 21 (omitted for easier comprehension in FIG. 2). Advantageously, in the normal transportation position shown in FIG. 1, the support elements are directed upward above the rotatable shaft 19.

Figure 7:
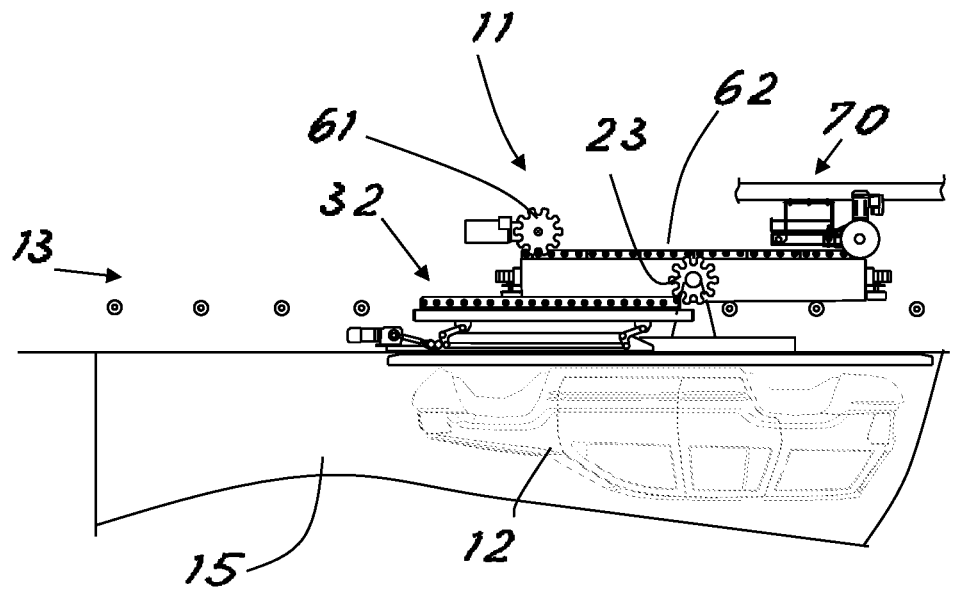

The trolley 11 shown in the figures also comprises a rotation mechanism 22 for the controlled rotation of the rotatable shaft 19 which allows the bodywork 12 to be moved between a normal advancing position, as shown in FIG. 1, and an overturned position for immersion inside a basin 15, which is shown, for example, in FIG. 7.

The plant 10 also comprises a rotation actuating device 32 for actuating the rotation of the rotatable shaft 19. This rotation actuating device 32 is advantageously located in each zone along the plant 10 where it is required to perform the controlled rotation of the bodywork 12 about the axis 18 of a trolley 11.

Advantageously, the rotation mechanism 22 comprises a toothed rotation wheel 23 kinematically connected to the rotatable shaft 19, optionally via a transmission assembly 24 known per se with a suitable transmission ratio. Preferably, the transmission between toothed rotation wheel 23 and rotatable shaft 19 will be such that the toothed rotation wheel 23 and the rotatable shaft 19 rotate in the same direction. However, an opposite direction of rotation may also be used, if required. The transmission ratio may be preferably chosen so as to gear down the number of revolutions in order to reduce the force on the rotation actuating device 32 and on the advancing movement system. Moreover, the transmission ratio may be chosen so as to define a desired speed of rotation in relation to the speed of advancing movement and/or the number of teeth (rollers) of the rotation rack 33.

As can be clearly seen in the figures, the rotation actuating device 32 comprises advantageously a rotation rack 33 which is arranged along the direction of movement of the trolleys 11 along the conveying line 13.

The rotation rack 33 will have a form suitable for engagement with the toothed rotation wheel 23 so as to rotate the toothed rotation wheel 23 by means of the movement itself of the trolley 11 along the conveying line 13.

The trolley 11 may advantageously also support a controllable device 27 for locking/unlocking the free rotation of the rotatable shaft 19 so that the bodywork 12 does not rotate uncontrollably, for example, when the toothed rotation wheel 23 is not engaged with a rotation rack 33.

The controllable device 27 may, for example, act on the toothed rotation wheel 23 so as to block the rotation thereof. For example, it may be of the mechanical type formed by a frame 28 hingeably mounted on the trolley 11 and provided with an engaging element 30 and an actuating shoe 31. In the rest condition, the engaging element 30 is engaged with the toothed rotation wheel 23 so as to lock it, while a suitable operating surface along the trolley 11 conveying line 13 may act on the actuating shoe 31 so as to move the frame 28, thus raising the shoe and disengaging the engaging element 30 from the toothed rotation wheel 23 when required.

In the normal condition for conveying along the conveying line 13, there is no interference with the actuating shoe 31 and the trolley 11 is able to continue conveying the bodywork 12 in the upper position, while in the zones where the rotation of the bodywork 12 on the trolley 11 is to be released, it is merely required to provide suitable surfaces for operation of the actuating shoe 31.

In particular, an operating surface may be associated with the rotation actuating device 32 for actuating the rotation of the trolley 11 so that the wheel is released when it must be operated by this rotation actuating device 32.

Advantageously, as shown in the figures, the rotation rack 33 may be a roller rotation rack 33 and the toothed rotation wheel 23 may be a wheel which is correspondingly lobed or a petal wheel for engaging sequentially with its lobes between the rollers. This ensures secure, reliable, and relatively silent engagement. Moreover, the same rollers of the rotation rack 33 may form the surface for raising the actuating shoe 31. Alternatively, an independent surface for actuating the shoe may be provided in a suitable position, for example, parallel to and alongside the rotation rack 33.

The controllable device 27 for locking/unlocking the toothed rotation wheel 23 ensures also that the toothed rotation wheel 23 comes up against the rotation rack 33 in the correct position for engagement with the teeth without jamming, then allowing rotation when the engagement is secure.

Advantageously, the rotation actuating device 32 may also be movable controllably between an operating position engaged in the toothed rotation wheel 23 and a non-operating position where the wheel may pass along the rotation rack 33 without engaging with it and without the locking/unlocking device for the toothed rotation wheel 23 releasing the wheel. The movement of the rotation actuating device 32 may be performed, for example, using a motorized, hinged, parallelogram mechanism 38 which, when operated, raises or lowers the rotation rack 33 so as to move it between the two operating and non-operating positions, as may now be easily imagined by the person skilled in the art on the basis of FIG. 1.

If it is required for any reason to convey a trolley 11 into the vicinity of a rotation actuating device 32 without causing rotation thereof, it is thus sufficient to move the rotation actuating device 32 toward its non-operating position. For example, this may be useful in the case where there are some types of bodywork 12 which must be treated in some basins 15 and other bodywork 12 which must be treated in other basins 15 along the same conveying line 13 or in the case of maintenance activities which, for example, require the exclusion of one or more basins 15.

The plant 10 comprises according to the invention an additional traction system 60 for providing, when desired, the trolleys 11 with additional traction compared to the traction provided by the normal system for performing transportation along the conveying line 13. This additional system therefore provides a second system for moving the trolleys 11 along the conveying line 13.

In particular, when rotation of a bodywork 12 on the trolley 11 must be performed, the weight itself of the rotating bodywork 12 may result in the need for a thrust for displacing the trolley 11 along the conveying line 13 which is greater than that normally required for simple sliding of the trolley 11 with the bodywork 12 on the trolley 11 in the normal conveying position. This is particularly necessary, for example, when the rotation of the bodywork 12 is performed by the same forward movement of the trolley 11, as in the embodiment described above.

The additional traction system 60 comprises a toothed traction wheel 61 driven by an electric motor 66 and a complementary traction rack 62 arranged on the base body of the trolley 11 and extending parallel to the direction of movement of the trolley 11 so as to engage in the toothed traction wheel 61 upon passage of the trolley 11 into the zone where the additional traction is required. Advantageously, as can be clearly seen in FIG. 2, the traction rack 62 of the additional traction system 60 may be placed on one side of the trolley 11, for example, above the lateral runner 14a.

As can be seen in the figures, the toothed traction wheel 61 may be, for example, a wheel with petals or lobes and the traction rack 62 may be a roller-type traction rack 62.

The additional traction system 60 also comprises a first sensor 63 for detecting the angular position of the toothed traction wheel 61 and a second sensor 64 for detecting the approaching movement of the trolley 11 (or in an equivalent manner of its traction rack 62) toward the toothed traction wheel 61. The first and second sensors 63 and 64 are connected to a control system 65 (which may comprise, for example, a control circuit 65) which controls the motor 66 for rotation of the toothed traction wheel 61. The control system 65 and the first and second sensors 63, 64 form a synchronization system which allows the toothed traction wheel 61 to be engaged in the traction rack 62 while the trolley 11 advances, avoiding any jamming.

In particular, the control system 65 receives the signals from the first and second sensors 63, 64 and causes rotation of the toothed traction wheel 61 so as to synchronize electronically the wheel with the traction rack 62 so as to allow them to engage together without jamming, despite the sliding movement of the trolley 11, before the engagement is activated by the other system for driving the trolley 11 along the conveying line 13. The control system 65 may be a structure which is generally known per se for the systems for actuating an electric motor 66 and the detection and processing of signals from sensors (for example, an electronic circuit formed with cabled logic and with a suitably programmed microprocessor system). It will therefore not be further illustrated or described in detail here.

A synchronization method according to the invention, which may be implemented in the control system 65, may envisage also the following steps:

Initially, when the toothed traction wheel 61 is not engaged in the traction rack 62, the angular position of the toothed traction wheel 61 is detected by means of the first sensor 63 and the motor 66 is controlled so as to bring the toothed traction wheel 61 into a given position suitable for subsequent engagement with the traction rack 62 of an incoming trolley 11. In particular, the wheel may be arranged with a recess between two teeth directed toward the traction rack 62 so as to receive the first roller or tooth thereof. The first sensor 63 may be any known sensor suitable for detecting the correct position of the wheel. For example, it may be an absolute encoder, a proximity sensor which controls a tooth, etc. The first sensor 63 may also be incorporated in the motor 66 or consist of the motor 66 itself. For example, an absolute angular control motor may be used.

Obviously it is not necessary to know exactly which recess (or tooth) is in the correct position, but it is sufficient to detect that the wheel is in the desired position suitable for subsequent engagement.

Preferably, once the traction wheel is positioned as a result of the first sensor 63, the control system 65 stops the motor 66 and the toothed traction wheel 61 is released (not braked).

The control system 65 then waits for detection of arrival of a trolley 11 and starts the motor 66 with a predetermined acceleration ramp when the front end of the traction rack 62 moves closer toward the toothed traction wheel 61 until the toothed traction wheel 61 and traction rack 62 engage with each other.

The second sensor 64 may advantageously form part of a linear positioning system such as a linear encoder. The second sensor 64 may also be a proximity sensor.

When the trolley 11 arrives, if there should be a small impact between the traction rack 62 and a tooth, this impact may in any case be absorbed by the mechanical friction of the motor 66 (which will preferably be a gear motor) which at the moment of impact will be advantageously braked and have a low or zero operating torque.

At a given relative position of the traction rack 62 and a petal of the toothed traction wheel 61 (calculated by the control system 65 using the second sensor 64) which establishes that engagement has now started, the motor 66 may be advantageously activated by means of a gradual torque.

The rising torque curve is advantageously graduated so as to make engagement as soft as possible, preventing excessive acceleration or deceleration which could result in an anomalous force acting on the trolley movement system which moves the trolley 11 toward the engagement point.

After engagement, the motor 66 is controlled by the control system 65 so as to continue with rotation of the toothed traction wheel 61 so as to move the trolley 11 along the conveying line 13 by means of the traction rack 62 engaged in the toothed traction wheel 61. The speed of movement of the trolley 11 will therefore be essentially governed by the control system 65 by means of the motor 66.

Essentially, the start of the command for rotation of the motor 66 is determined by means of the second sensor 64 which allows the control system 65 to calculate when the front end of the traction rack 62 comes up against the first tooth of the toothed traction wheel 61, positioned correctly by means of the first sensor 63.

Advantageously, the second sensor 64 also allows the detection of the position of the trolley 11 which is at the end of the engaging operation or which is in any case close to the end of engagement of the additional traction system 60. In this way, at the end of engagement, the motor 66 may be used again to position correctly the toothed traction wheel 61 by means of the first sensor 63 and wait for the arrival of the next trolley 11.

Obviously, even though the second sensor 64 has been described as a single sensor which may detect the position of the trolley 11 which is close to the start of engagement and the position of the trolley 11 which is close to the end of engagement, this second sensor 64 may be composed of two sensors which each detect one of the two positions so as to communicate them to the control system 65, as may now be easily imagined by the person skilled in the art.

Although the additional traction system 60 has been defined as an additional traction system 60, this additional traction system 60 must be understood as being a system which provides a greater traction for the movement of the trolley 11 and not necessarily as a system which is in addition to the normal system for moving the trolleys 11 along the conveying line 13. In particular, it may be envisaged that the system which moves the trolley 11 toward the point for engagement between the toothed traction wheel 61 and the traction rack 62 is deactivated once the toothed traction wheel 61 has engaged with the traction rack 62 so that the task of moving the trolley 11 is passed over entirely to the additional traction system 60.

In the case where the use of the additional traction system 60 is envisaged in order to favour the advancing movement during the operations for rotating the bodywork 12 on the trolley 11, the relative position of the additional traction system 60 composed of the toothed traction wheel 61 and traction rack 62 with respect to the rotation mechanism operated by the rotatable shaft 19 may be such that the rotation system acts only after engagement of the additional traction system 60 has been completed.

In particular, with the rotation mechanism shown in the figures, the toothed traction wheel 61 is positioned with respect to the rotation rack 33 for performing rotation of the rotatable shaft 19 so that engagement of the toothed rotation wheel 23 on the respective rotation rack 33 occurs only after engagement of the additional traction system 60 has been completed. Similarly, advantageously engagement of the additional traction system 60 terminates (namely the toothed traction wheel 61 is disengaged from the respective traction rack 62) only after rotation, namely engagement between the toothed rotation wheel 23 and the respective rotation rack 33, has terminated.

Advantageously, it may also be envisaged that, in the zone where engagement of the additional traction system 60 must be performed, movement systems with a motorized friction wheel are provided for the trolleys 11, these forming or also forming part of a first system for moving the trolleys 11.

This is, for example, illustrated by way of example in the form of a single motorized friction traction device 70 in FIG. 1. These systems may, however, may be more than one in number, being distributed along the conveying line 13 so that they are able to pass in sequence from one trolley 11 to another trolley 11 along the conveying line 13 (as, for example, shown schematically in FIG. 8). Along the sections where the trolley 11 is moved by these friction traction devices 70 and/or by the additional traction system 60, the conveying line 13 may be advantageously of the passive type, namely without a drive system or with the drive system deactivated. For example, along these sections the conveying line 13 may be composed of idle rollers and/or by sliding surfaces.

The friction traction device 70 which pushes the additional traction system 60 toward the engagement point may be easily switched off once engagement of the additional traction system 60 has been completed (i.e., with at least one tooth engaged) so that the traction of the trolley 11 is transferred from the friction traction device 70 to the additional traction system 60. The opposite may happen when the action of the additional traction system 60 has terminated, namely when the traction rack 62 is no longer engaged with the toothed traction wheel 61.

In order to activate and deactivate the friction traction devices 70 at the right moment, operation thereof is also advantageously controlled by the control system 65 which, via the second sensor 64, detects the start and the end (or the nearing of the end) of engagement of the additional traction system 60. Alternatively, the friction traction devices 70 may continue to operate so that their action is added to that of the toothed traction wheel 61, even though this may complicate the system for controlling the speeds of the two systems such that they are uniform with each other.

Figure 3:
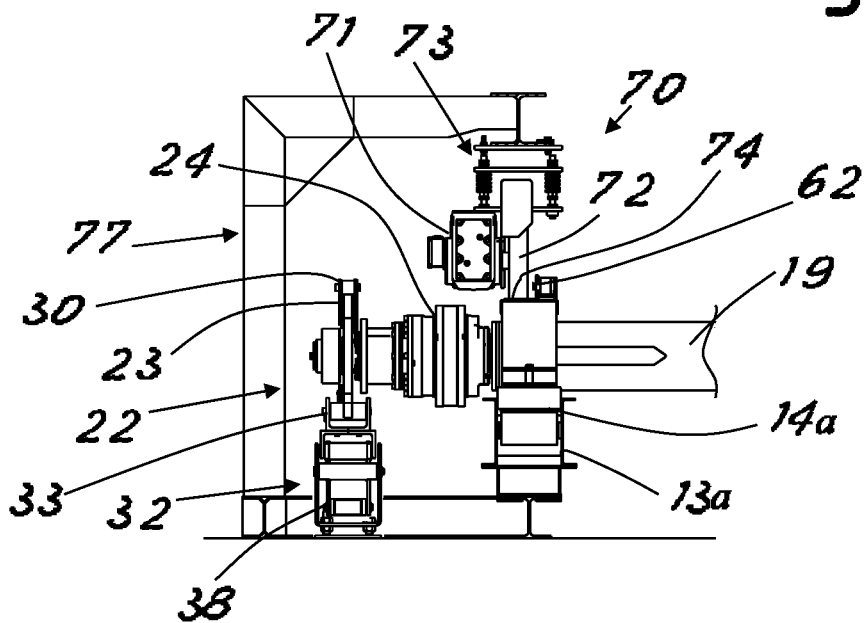
FIG. 3 shows a schematic view, on a larger scale, of the plant cross-sectioned along the line III-III of FIG. 1.

As shown, for example, in FIGS. 1 and 3, the friction traction device 70 may comprise a gear motor 71 which operates a motorized wheel 72 which rests on a suitable surface of the passing trolley 11. Advantageously, the motorized wheel 72 may be pushed against this surface with a suitable pressure by means of a resilient thrusting system 73, for example, of the spring type. As can be clearly seen, for example, in FIG. 3, the surface of the trolley 11 on which the motorized wheel 72 rests for movement of the trolley 11 may be a suitable surface 74 parallel and close to the traction rack 62.

Figure 4:
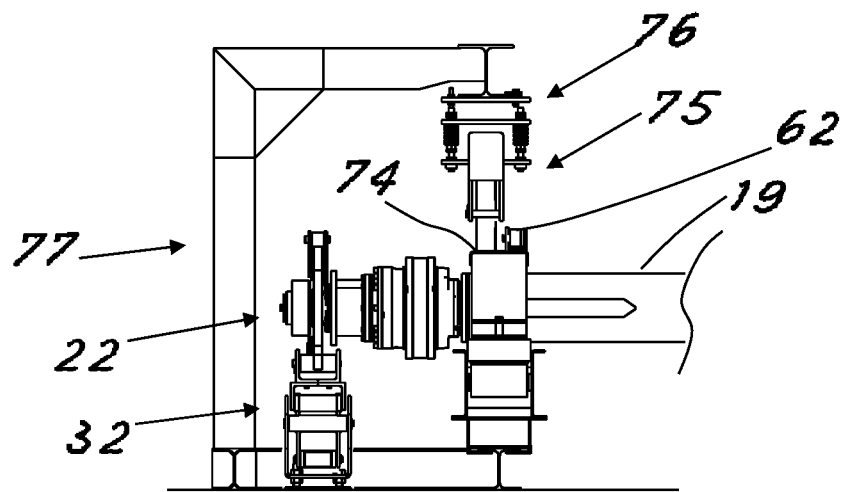
FIG. 4 shows a schematic view similar to the cross-section of FIG. 3 and with a further device of a plant according to the invention.

In order to ensure that the trolley 11 remains on the conveying line 13 without being lifted laterally despite the forces acting on it for conveying and rotation along the plant 10, idle wheels 75 may be provided at intervals in suitable positions, these resting vertically on top of suitable sliding surfaces of the trolley 11. As shown in FIG. 4, these surfaces may be, for example, the same surface 74 for supporting the motorized wheel 72.

Preferably, the idle wheels 75 may be pushed against the corresponding surfaces of the trolley 11 by means of a resilient thrusting system 76, for example, of the spring type, for providing an adequate vertical pressure.

As is clear from the figures, the devices for rotating the bodywork 12, the toothed traction wheel 61 with the associated motor 66, any friction traction devices 70, and any idle wheels 75 may be advantageously all arranged on the same side of the trolleys 11 and preferably outside of the vertical plane of the basins 15 so as to simplify the structure and the maintenance of the plant 10. In particular, the additional friction traction devices 70 formed by the toothed traction wheel 61 and the associated motor 66, the friction traction devices 70, and any idle wheels 75 may be suspended from a fixed frame 77 arranged on one side of the conveying line 13. This frame 77 may advantageously comprise uprights which are generally in the form of an overturned 'L' and horizontal beams and may also define a space for allowing the toothed rotation wheel 23 and the associated rotation actuating devices 32 to pass through, as is clearly visible in FIGS. 2, 3, and 4.

The friction traction devices 70 may be present only at the inlet, only at the outlet, at both the inlet and outlet, or may be not present at all, depending on the requirements and structure of the conveying system, as may now be easily understood by the person skilled in the art on the basis of the description provided hitherto.

Figure 5:
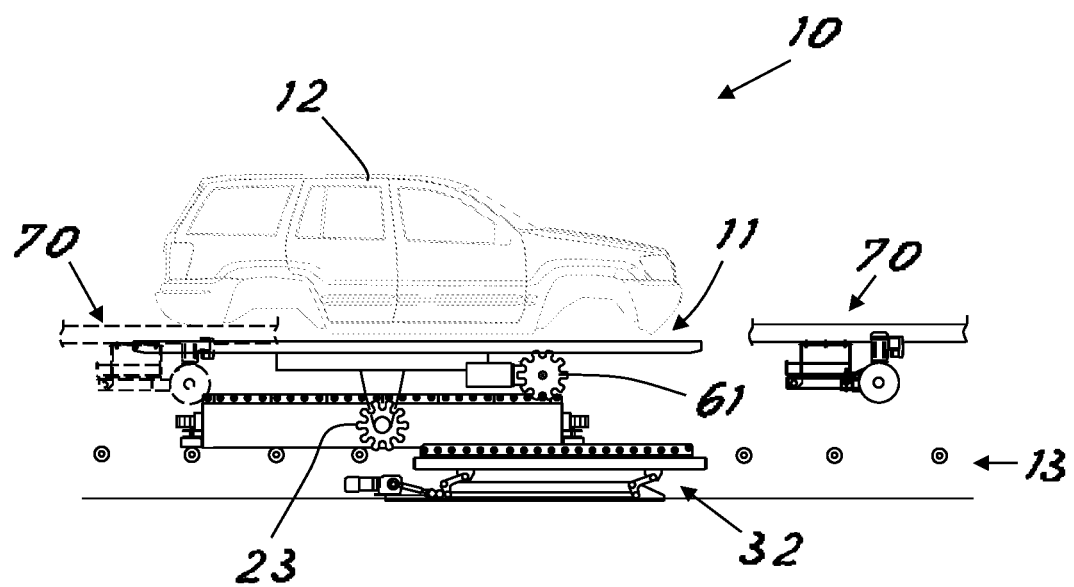
FIGS. 5, 6 and 7 show two different operating steps along the plant according to the invention.
Figure 6:
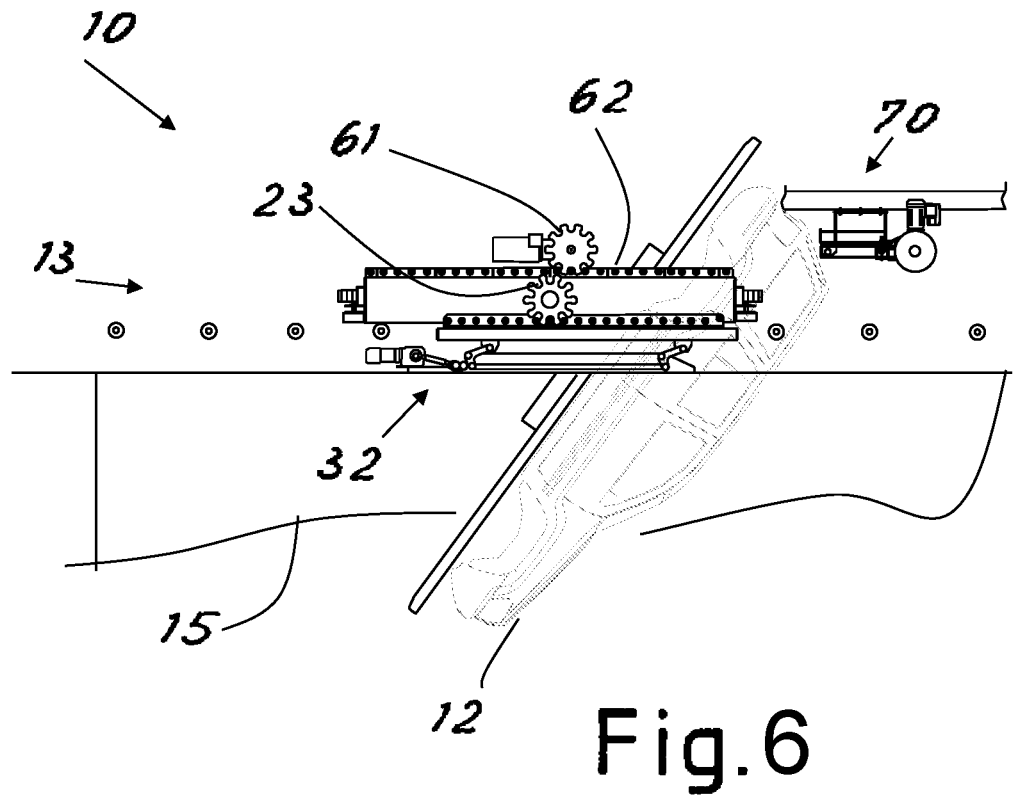

FIGS. 5, 6, and 7 show by way of example various operating steps in a plant 10 according to the invention. In particular, FIG. 5 shows a trolley 11 during its approach movement toward the rotation system after the additional traction system 60 has been engaged. This FIG. 5 also shows in broken lines the possible existence of a friction traction device 70 for pushing the incoming trolley 11 toward the engagement point of the additional traction system 60 and in solid lines a friction traction device 70 for pulling the trolley 11 out from the engagement point of the additional traction system 60.

FIG. 6 shows the action of the rotation system which rotates the bodywork 12 so as to overturn it and immerse it in an underlying basin 15.

As is now clear to the person skilled in the art, the length of the rotation rack 33 may be determined so as to produce any desired angle of rotation, also by combining it with the transmission ratio chosen for the transmission of the movement between the toothed rotation wheel 23 and the rotatable shaft 19. For example, the angle of rotation of the rotatable shaft 19 formed by sliding of the toothed rotation wheel 23 along the entire rotation rack 33 may be suitably chosen as fractions within the range of 0° to 360°, depending on the requirements of the treatment process and/or the number of teeth (rollers) of the rotation racks 33. For example, the rotation may be in the region of 180° or in the region of 360°. The angle of rotation may also be chosen so as to keep the bodywork 12 at a small angle when entering and/or exiting the rotation system, depending also on the requirements of the treatment process.

FIG. 7 also shows in schematic form a possible design of the plant 10 which allows the bodywork 12 to be overturned and to remain immersed in the overturned position until the next rotation system is reached and the bodywork 12 on the trolley 11 is brought back upright. In this case, in the overturned condition of the bodywork 12, the action of the additional traction system 60 may no longer be necessary. As can be seen in FIG. 7, both engagement of the additional traction system 60 and engagement of the rotation system may therefore terminate after the overturning operation and the trolley 11 may advance by means of the action of the transportation system formed by the conveying line 13 and/or any friction traction devices 70.

In this way, the bodywork 12 may remain immersed inside the basin 15 (designed with a suitable lengthwise dimension) along a predetermined section of the conveying line 13 and for a predetermined duration. A following rotation system with an associated additional traction system 60 such as those described above and shown in FIG. 1, may then bring the bodywork 12 out of the basin 15.

Figure 8:
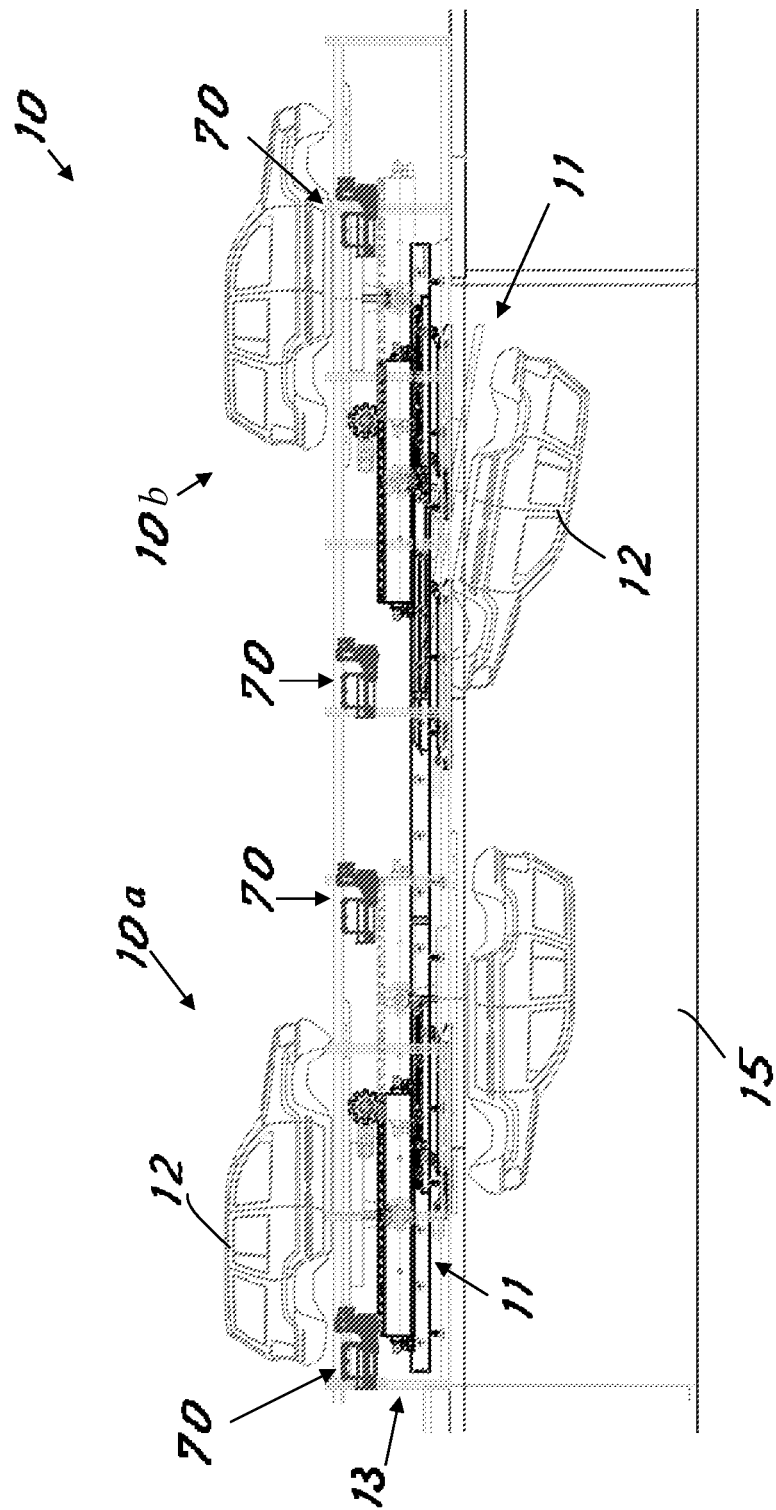
FIG. 8 shows in schematic form a part of a plant according to the invention during various possible operating steps.

All of this is shown schematically in FIG. 8 which shows, in sequence, two rotation systems 10a and 10b of a plant 10 according to the invention, the first one of which turns the bodywork 12 over inside the basin 15 and the second one of which (which may be at any distance from the first one, depending on the bodywork 12 immersion requirements) brings the bodywork 12 back into the normal transportation position.

As can be seen in FIG. 8, at the start of a long basin 15 a rotation rack 33 having a length such as to produce a half rotation of the rotatable shaft 19 may be provided, so as to overturn completely the bodywork 12 and immerse it completely inside the basin. The trolley 11 may then proceed along the basin 15 with the bodywork 12 immersed. At the end of the basin 15 a second rotation rack 33 may be provided, said rotation rack 33 having a length such as to produce another half rotation of the rotatable shaft 19 so as to completely raise the bodywork 12 into the normal advancing position (which is not necessarily horizontal, but also depends on the transportation requirements and/or the treatment process and in which the bodywork 12 may also be inclined).

Alternatively, for example, in the case of short basins 15, a single rotation rack 33 may be obviously designed with a length such as to cause the bodywork 12 to perform a full rotation during the advancing movement of the trolley 11.

If necessary, the trolley 11 may also be stopped when the bodywork 12 is fully immersed, such as to cause it to remain in the liquid for the entire duration needed for the particular treatment.

It is also possible to consider making the bodywork 12 perform several immersion and emersion rotations, by means of a suitable longer rotation rack 33 or several rotation racks 33 in sequence, or perform only partial overturning operations, for example, in order to keep the immersed or partially immersed bodywork 12 inclined, so as to allow evacuation of the air bubbles.

Obviously, when necessary, the engagement of the additional traction system 60 will also be provided so as to ensure the necessary additional thrusting action for moving the trolleys 11.

At this point it is clear to the person skilled in the art how it is possible to combine the various parts of the plant 10 according to the invention in order to obtain desired progressions of the bodywork 12 along the conveying line 13, with great ease and flexibility.

Obviously, the above description of an embodiment applying the innovative principles of the present invention is provided by way of example of these innovative principles and must therefore not be regarded as limiting the scope of the rights claimed herein.

For example, especially along the sections which do not coincide with treatment basins 15, the transportation system may be of any known type, for example, of the type with traction from below using interconnected motorized rollers, etc. It is also possible to easily imagine how the various embodiments and the various devices described may be combined with each other in any number in order to perform treatments which are complex and/or with immersion of a bodywork 12 in successive treatment basins 15.

As mentioned above, the conveying line 13 may also be designed with systems different from the motorized rollers on which the skids rest and travel. For example, other systems, such as linear motors or friction rollers, etc., may be used, as may be now easily imagined by the person skilled in the art on the basis of the description provided above.

Known systems for causing oscillation of the immersed bodywork 12 in order to facilitate, for example, the evacuation of air bubbles may also be provided. These known systems may act, for example, on the rotatable shaft 19 during the forward movement of the trolley 11 with the bodywork 12 immersed and the rotatable shaft 19 released.

For example, the overturning systems and the structure of the trolleys 11 may be different from those shown. For example, as already mentioned above, the trolley 11 may have an H-shaped structure in plan view with two side members provided with runners or wheels. The sections of the plant 10 which require the additional traction according to the present invention may also be different from those shown here by way of example, the additional traction system 60 being able to be used along other sections where the force for movement of the trolley 11 requires the additional traction provided by the additional traction system 60.

The invention claimed is:

1. A plant for treatment of bodyworks, the plant comprising:
   at least one trolley configured to support a bodywork to be treated;
   a conveying line configured to transport the at least one trolley along the plant;
   a first system configured to move the at least one trolley along the conveying line, the first system comprising a traction rack extending in a direction of movement of the at least one trolley along the conveying line;
   a second system configured to move the at least one trolley along the conveying line in at least one zone of the plant, the second system comprising a toothed traction wheel, driven by a motor under control of a control system and configured to engage in the traction rack upon passage of the at least one trolley into the at least one zone of the plant so as to move the at least one trolley along a portion of the conveying line under the control of the control system; and
   sensors configured to detect angular position of the toothed traction wheel and approaching movement of the at least one trolley toward the toothed traction wheel, and connected to the control system so as to cause engagement between the traction rack and the toothed traction wheel upon arrival of the at least one trolley;
   wherein idle wheels are arranged at intervals along the conveying line, and
   wherein the idle wheels rest vertically on top of corresponding sliding surfaces of the at least one trolley.

2. The plant of claim 1, wherein the at least one zone of the plant comprises a process liquid basin,
   wherein the conveying line carries the at least one trolley over the process liquid basin, and
   wherein the plant further comprises devices for rotation of the bodywork to be treated on the at least one trolley which has arrived above the process liquid basin.

3. The plant of claim 1, wherein the traction rack comprises a sequence of rollers, and
   wherein the toothed traction wheel is a lobed wheel configured to engage between the rollers of the sequence of rollers.

4. The plant of claim 2, wherein at least in a part of the portion of the conveying line where the toothed traction wheel is engaged in the traction rack on the at least one trolley, there are means for actuating devices for rotation of the bodywork to be treated on the at least one trolley.

5. The plant of claim 4, wherein the at least one trolley comprises a base part for support and movement along the conveying line and a support part for supporting the bodywork to be treated,
   wherein the support part is rotatably supported on the base part using a rotatable shaft so that the support part is configured to rotate between a first upper position and a second position for immersing the bodywork to be treated in the process liquid basin,
   wherein the devices for rotation of the bodywork to be treated comprise a toothed rotation wheel which is kinematically connected to the rotatable shaft, and
   wherein the means for actuating devices for rotation of the bodywork to be treated on the at least one trolley comprises a rotation actuating device provided with a rotation rack which is designed to engage the toothed rotation wheel to actuate the rotation of the support part of the at least one trolley using movement of the at least one trolley along the rotation rack.

6. The plant of claim 5, wherein the rotation actuating device is movable controllably between an operating position and a non-operating position, respectively, for engagement and non-interference with the toothed rotation wheel during the movement of the at least one trolley along the rotation rack.

7. The plant of claim 5, wherein the at least one trolley comprises a controllable device for locking/unlocking free rotation of the rotatable shaft.

8. The plant of claim 7, wherein the controllable device for locking/unlocking the free rotation of the rotatable shaft is a mechanical device controlled to perform unlocking using interference with release surfaces arranged along the conveying line.

9. The plant of claim 1, wherein the first system comprises friction traction devices along the conveying line which comprise a motorized wheel configured to contact a corresponding surface of the at least one trolley so as to move the at least one trolley along the conveying line under the control of the control system.

10. The plant of claim 9, wherein the friction traction devices are arranged along the conveying line so as to move the at least one trolley along the conveying line at least into a vicinity of a point for engagement and/or disengagement of the toothed traction wheel with the traction rack.

11. The plant of claim 1, further comprising:
means for actuating devices for rotation of the bodywork to be treated on the at least one trolley; and
friction traction devices;
wherein the toothed traction wheel, the means for actuating the devices for rotation of the bodywork to be treated on the at least one trolley, the friction traction devices, and the idle wheels are arranged on a same side of the at least one trolley along the conveying line.

12. A method for providing additional traction to at least one trolley configured to support a bodywork to be treated along a conveying line in a plant for treatment of bodyworks, the method comprising:
providing on the at least one trolley a traction rack extending in a direction of movement of the at least one trolley along the conveying line;
arranging in at least one zone along the conveying line a toothed traction wheel which is driven by a motor controlled by a control system and which is configured to engage in the traction rack when the at least one trolley passes into the at least one zone so as to move the at least one trolley along a portion of the conveying line under control of the control system;
arranging sensors configured to detect angular position of the toothed traction wheel and approaching movement of the at least one trolley toward the toothed traction wheel, and connected to the control system of the toothed traction wheel;
detecting the angular position of the toothed traction wheel and, when the toothed traction wheel is not engaged in the traction rack, driving the motor so as to bring the toothed traction wheel into a position for subsequent engagement with the traction rack of the at least one trolley;
detecting arrival of the at least one trolley and starting the motor with a predetermined acceleration ramp when a front end of the traction rack approaches the toothed traction wheel until the toothed traction wheel and the traction rack are engaged; and
driving the motor so as to continue rotation of the toothed traction wheel for a pushing action of the at least one trolley along the conveying line using the traction rack engaged in the toothed traction wheel.

13. The method of claim 12, further comprising:
arranging, along the conveying line, friction traction devices which have at least one motorized wheel configured to contact a corresponding surface of the at least one trolley so as to move the at least one trolley along the conveying line; and
actuating the friction traction devices so as to move the at least one trolley along the conveying line at least into a vicinity of a point for engagement and/or disengagement of the toothed traction wheel with/from the traction rack.

14. A plant for treatment of bodyworks, the plant comprising:
at least one trolley configured to support a bodywork to be treated;
a conveying line configured to transport the at least one trolley along the plant;
a first system configured to move the at least one trolley along the conveying line;
a second system configured to move the at least one trolley along the conveying line, the second system comprising a toothed traction wheel, motor, and control system;
a first sensor configured to detect angular position of the toothed traction wheel; and
a second sensor configured to detect approaching movement of the at least one trolley toward the toothed traction wheel;
wherein the at least one trolley comprises a traction rack extending in a direction of movement of the at least one trolley along the conveying line,
wherein the toothed traction wheel is driven by the motor under control of the control system,
wherein the toothed traction wheel is configured to engage in the traction rack upon passage of the at least one trolley into at least one zone of the plant so as to move the at least one trolley along a portion of the conveying line under the control of the control system,
wherein the first and second sensors are connected to the control system so as to cause engagement between the toothed traction wheel and the traction rack upon arrival of the at least one trolley,
wherein idle wheels are arranged at intervals along the conveying line, and
wherein the idle wheels rest vertically on top of corresponding sliding surfaces of the at least one trolley.

15. The plant of claim 14, further comprising:
a process liquid basin; and
a device configured to rotate the bodywork to be treated on the at least one trolley when the at least one trolley is above the process liquid basin;
wherein the conveying line is configured to carry the at least one trolley over the process liquid basin.

16. The plant of claim 14, further comprising:
a process liquid basin in the at least one zone of the plant; and
a device configured to rotate the bodywork to be treated on the at least one trolley when the at least one trolley is in the at least one zone of the plant;
wherein the conveying line is configured to carry the at least one trolley over the process liquid basin.

17. The plant of claim 14, wherein the traction rack comprises a sequence of rollers, and
wherein the toothed traction wheel is a lobed wheel configured to engage between the rollers of the sequence of rollers.

18. The plant of claim 14, wherein the at least one trolley comprises:
a base part for support and movement along the conveying line; and
a support part configured to support the bodywork to be treated;
wherein the support part is rotatably supported on the base part using a rotatable shaft, and
wherein the support part is configured to rotate between a first position above the conveying line and a second position below the conveying line.

19. The plant of claim 14, wherein the at least one trolley comprises:
a base part for support and movement along the conveying line; and a support part configured to support the bodywork to be treated;

wherein the support part is rotatably supported on the base part using a rotatable shaft, and wherein the support part is configured to rotate between a first position, in which the bodywork to be treated is not immersed in a process liquid basin, and a second position, in which the bodywork to be treated is at least partially immersed in the process liquid basin.

20. The plant of claim 14, wherein the at least one trolley comprises:

a base part for support and movement along the conveying line; and a support part configured to support the bodywork to be treated;

wherein the support part is rotatably supported on the base part using a rotatable shaft, wherein the support part is configured to rotate between an upper position and a lower position, and wherein in the lower position of the support part, the bodywork to be treated is at least partially immersed in a process liquid basin.

\* \* \* \* \*